Figure 1:
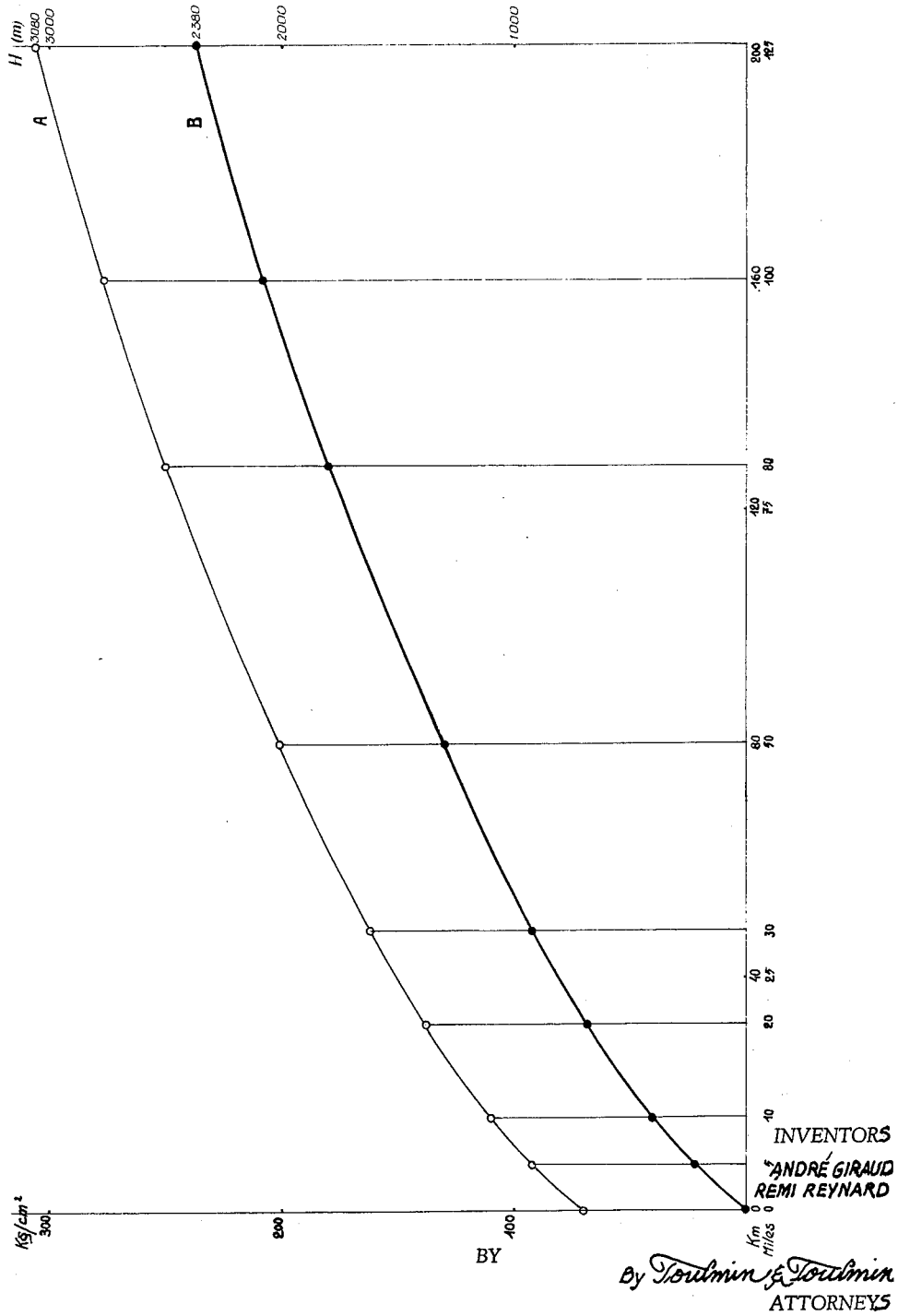

United States Patent Office 3,216,203
Patented Nov. 9, 1965

3,216,203
SUBMARINE CONVEYANCE OF FLUIDS THROUGH A FLEXIBLE PIPE LINE
André Giraud, Paris, and Rémi Reynard, Jonquieres Vaucluse, France, assignors to Institut Francais du Petrole, des Carburants et Lubrifiants, Rueil-Malmaison, France
Filed Nov. 14, 1962, Ser. No. 237,458
Claims priority, application France, Nov. 16, 1961, 879,216
1 Claim. (Cl. 61—72.3)

This invention relates to submarine conveying of fluids through a flexible pipe line. As an example of liquids and gases which may be conveyed according to this invention are particularly to be mentioned the liquid and gaseous hydrocarbons, for instance crude oil, refined liquid products such as gasoline, gas oil, gaseous hydrocarbons such as natural gas, propane, butane and the like.

Up to now the submarine conveyance of fluids was effected by means of rigid pipes laid on the sea bed or even sunk in the latter at a given depth so as to protect them against deterioration by anchors or dredgers. Additionally in view of protecting them against corrosion they are often coated with concrete which increases their weight and thus offers the further advantage of increasing the stability of the pipe line.

However, such rigid pipes suffer from a number of drawbacks, particularly in view of the difficulties encountered during the laying and connection of the various pipe portions. Another drawback results from the necessity of a preliminary exploration for determining the profile of the sea bed to which must be adapted the profile of the pipe line.

In the case of an uneven surface of the sea bed additional difficulties arise in the laying operations and as a consequence of the resulting strains.

In order to avoid these last-mentioned drawbacks resulting from the nature of the underground it has been contemplated to make use of pipe lines maintained between the surface and the bottom and more generally in the vicinity of the latter. Accordingly devices have been contemplated for maintaining by anchoring to the bottom a lightened pipe.

Such a system offers numerous advantages as compared to the preceding system of laying the pipe on the sea bed, one of the major drawbacks of which was the impossibility of predetermining with accuracy the external strains to which the pipe had to be subjected as a result of unforseeable changes in the profile of the terrain, occurring after the pipe has been laid, which changes, particularly where in the form of sudden seismic pertuberations such as faults, land-slides, sink-holes, may even cause the breaking of the pipe. Additionally a pipe laid on the sea bed is subjected to a substantial abrasion resulting from its displacement generated by the action of the undercurrents.

As compared to this conventional system, the maintenance of the pipe between the bottom and the surface of the sea makes it necessary to lighten the pipe to a sufficient extent as to make its buoyancy positive and requires the use of anchoring devices spaced along its whole length at relatively short intervals so as to distribute the strains resulting from the undercurrents.

Finally, in both cases (pipe laid on the sea bed or maintained at a certain level in the vicinity thereof, by buoyancy) the pipe must exhibit a resistance to crushing substantially higher than the difference between the hydrostatic pressure (which may be very high in the case where the sea bed is at great depth) and the working pressure (which is always relatively low in the vicinity of the delivery terminal).

Accordingly, it is necessary to make use of a very thick pipe where the sea bed is at great depth, which further requires additional lightening means.

In fact only a steel pipe is to be used in such cases, and it must be of a large thickness when intended to be fed with a high pressure fluid, in order to avoid the use of too many pipes and to increase the tensile strength of the pipe, so as to make it possible to reduce the number of anchoring devices. Such use of a steel pipe further requires protection means against corrosion, which results in a weight increase of the pipe (also necessitating compensating lightening means) and in a corresponding cost increase.

Besides, the laying operations of such a steel pipe are very delicate in view of the cutting strains which may be imparted to the pipe during the lowering (or the withdrawal) thereof, said cutting strains resulting in some cases in the breaking of the pipe.

The pipe may also be subjected to cutting strains after it had been placed on the sea-bed, for instance as a result of seisms, sub-soil changes such as landslides, casual changes of the cable length to the anchoring points and the like, or even due to the strength of undercurrents.

There is accordingly a permanent risk of breaking the tube which is the more important that in such a case the pipe is irremediably lost since its exact position is in most cases unknown.

It is therefore an object of this invention to avoid these drawbacks by providing a submarine pipe line which may be easily placed in position, without preliminary exploration of the sea-bed.

It is another object of this invention to provide a submarine pipe line which cannot be subjected to serious cutting strains resulting in a risk of breaking thereof or in a substantial abrasion.

It is still another object of this invention to provide a submarine pipe line placed between the surface and the bottom of the sea and which is not subjected to high crushing strains, even where placed at great depth.

It is yet another object of this invention to provide a submarine pipe line of reduced weight to which a positive buoyancy may be given by use of lightening means, to a relatively small extent.

Figure 2:
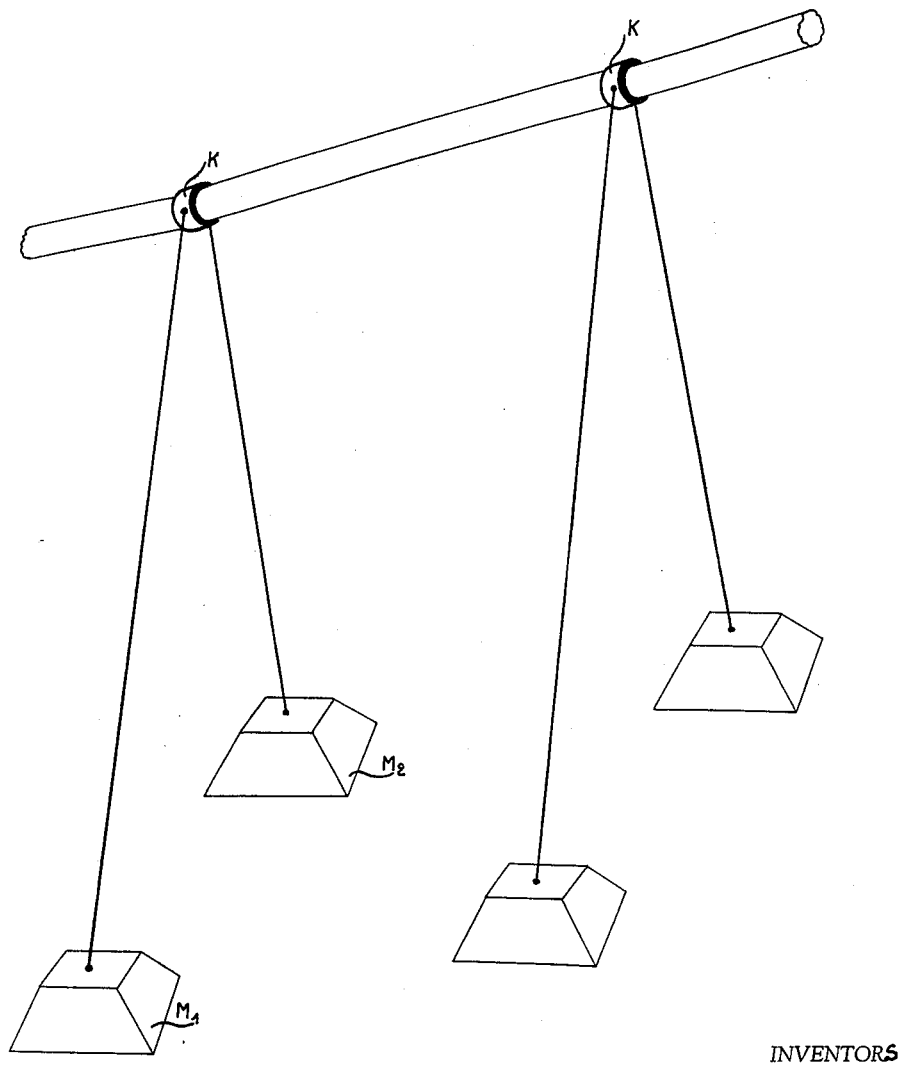

These objects are achieved by the flexible sub-marine pipe line according to this invention which is placed between the surface and the bottom of the sea bed at a depth of each portion of the pipe which is related to the distance between said portion of the pipe and the starting terminal thereof, as it is apparent from the following specification and claims taken in conjunction with the accompanying drawings wherein:

FIGURE 1 is a diagram of the ideal curve of the pipe depth in relation to the length thereof, FIGURE 2 is a schematic diagram illustrating an anchoring system for a pipe line of positive buoyancy.

Due to its flexibility the pipe line according to this invention is better adapted to support the above-mentioned external stresses and cutting strains and particularly those resulting from the undercurrents.

As a matter of fact, owing to this flexibility these cutting strains to which the pipe may be subjected are for the most part distributed over a certain length thereof and converted to traction strains which are much more easily sustained by the pipe.

The flexible pipe used may be made of a material having a low elasticity modulus such as for instance rubber, plastic materials such as polyvinyl chloride, polyethylene, polypropylene and the like, and provided with at least a layer of reinforcing metallic wires or cables, which may be associated to a second similar layer of wires or cables wound in an opposite direction so as to confer to the pipe a high resistance to internal pressure.

Other reinforcing layers may also be provided to improve the pipe resistance to traction.

The various types of pipe having the above-mentioned characteristics are well known in the art and need not to be explained more in detail. By way of example there may be used wired flexible pipes of the type described in the U.S. Patent No. 2,825,364.

In the case where the undercurrents are not very strong a moderate elasticity of the pipe may be sufficient, particularly for a pipe of great length. Thus it may be advantageous in such a case, to make use of a pipe of a large diameter made of concrete, optionally reinforced concrete, or any other material of sufficient elasticity, provided for instance with a layer of metallic wires the turns of which are perpendicular to the axis of the pipe or have an inclination with respect to the latter which is close to 90°, and wires for supporting traction strains.

Whatever may be the material of which the pipe is made (plastic material, rubber, concrete or any other material of sufficient elasticity) the conditions of use of such a pipe according to the present invention, do not require more than a moderate resistance of the latter to the pressure strains.

As a matter of fact, according to this invention, the depth of each portion of the pipe is so adjusted that the most part or the entirety of the working pressure is balanced by the external hydrostatic pressure on the pipe portion.

Accordingly the pipe is to be maintained close to the bottom (or even on the bottom) as long as the internal pressure is higher than the hydrostatic pressure. To the parts of the pipe, where, as a result of the loss of pressure, the internal pressure falls to a level lower than that of the hydrostatic pressure on the bottom, are given an upward inclination towards the surface, whereby the hydrostatic pressure is accordingly decreased.

According to this invention the upward inclination given to the pipe towards its delivery terminal is so selected for each portion of the pipe as to maintain substantially constant the difference between the hydrostatic and the internal pressures to which is subjected said pipe portion.

Thereby the differences in external pressure due to the differences in depth of the various pipe portions tend to balance the internal pressure differences resulting from the loss of pressure through the pipe.

Accordingly the pipe is subjected, over its whole length, to substantially constant strains, which is a particularly advantageous feature in view of the fact that in most cases the resistance of the pipe to crushing is substantially lower than its resistance to internal pressure. Moreover, such conditions of use according to which the strains are maintained substantially constant and may be reduced to negligible values where the depth of the sea bottom is sufficient, are particularly well adapted to the use of a flexible pipe line made of wired plastic material, which is susceptible to deterioration as a result of high pressure differences applied thereto, especially owing to the creepage of the plastic material between the turns of the wires.

With a constant diameter of the pipe and everything being otherwise unchanged, the pressure loss of a given gas conveyed through the pipe is expressed by the following equation:

$$p_1{}^2 - p_0{}^2 = KL$$

wherein $p_1$ is the internal pressure in the considered pipe portion, $p_0$ is the internal pressure at the delivery terminal, L is the pipe length between the considered portion thereof and the delivery terminal, and K is a constant coefficient.

The above equation may be written:

$$p_2{}^2 = p_0{}^2 + KL$$

which gives the value of $p_1$:

$$p_1 = \sqrt{p_0{}^2 + KL}$$

wherein $p_0$ is a constant.

The variation of the pressure loss in relation to the length L is shown by curve A of FIGURE 1 for a pipe line having a total length of 125 miles and a 20 inch diameter, and intended for the conveyance of natural gas at a temperature of 15° C. (the coefficient of compressibility of said gas being assumed equal to 1) the gas pressure at the starting terminal of the pipe being of 308 kg./cm.² and the pressure at the delivery terminal of 70 kg./cm.².

This curve also corresponds to the curve of ideal depth of the various pipe portions in relation to their respective distance to the delivery terminal. This ideal depth is that for which the hydrostatic pressure is equal to the internal pressure of the gas in any portion of the pipe, or for which the difference between said hydrostatic and said internal pressures has the same value for the different portions of the pipe.

For instance if it is desired to exactly balance the internal and external pressures, the pipe portion has to be immersed at a depth of $10x$ meters where $x$ is the internal pressure expressed in kg./cm.².

With reference to the example illustrated by the curve A of FIGURE 1, if it is desired to maintain a substantially constant excess of 70 kg./cm.² of the internal pressure over the external pressure, the curve B giving the depth of the different portions of the pipe for which said condition is fulfilled may be simply derived from the curve A expressing the pressure loss in the pipe, by a mere translation corresponding to a depth of 700 meters. The lower portion of the pipe, in the vicinity of the starting terminal, will thus have to be at a depth of 2,380 meters in order to maintain the above-mentioned pressure difference of 70 kg./cm.² in the considered case of a pipe of a 125 miles length. If the maximum depth of the sea bottom is lower than this value and is for instance equal to 2,000 meters the actual pressure difference to which is subjected the pipe in the vicinity of the starting terminal will exceed the designed pressure difference by about 38 kg./cm.² and accordingly a certain portion of the pipe will be subjected to a pressure difference varying between 108 and 70 kg./cm.².

From a general point of view it will be convenient to reduce as much as possible the strains resulting from the internal pressure, to which the pipe is subjected, by selecting the internal pressure at the starting terminal at a level which is not substantially higher than the hydrostatic pressure on the sea bottom in the vicinity of said starting terminal.

In the case, where, for economical or other reasons, the pressure at the starting terminal is selected lower than the hydrostatic pressure on the sea bottom in the vicinity of said terminal, the immersion depth will be so adjusted as to substantially balance the internal and external pressures or maintain a constant difference therebetween.

The performance requirements for the pipe are accordingly reduced but care must be taken to avoid any risk of deterioration of the pipe in the case where the strains to which it is subjected might be casually changed, particularly in the case where the internal pressure would fall to a value lower than that of the hydrostatic pressure.

Although a certain excess of the external pressure over the working pressure may be allowed since the pipe has a certain resistance to an external pressure difference, such an excess must, however, be kept relatively low in order to avoid any risk of crushing.

According to this invention such risks are avoided by the use of a piper of positive buoyancy associated with such stabilization means as to provide an average density of the corresponding assembly which is just equal to the density of water.

These stabilization means must have a weight which is variable in relation to the depth so that any change in depth of the pipe, resulting from a change in the average density of the assembly, be limited to a reduced amplitude, due to a readjustment of the value of said density to that of the water. Such stabilization means of varying weight may consist for instance of a chain, a portion of which rests on the sea bottom so that the partial weight of the chain supported by the pipe increases in proportion to the decrease in depth of the latter and vice-versa.

The effect of such a chain is thus to balance a lightening of the pipe (resulting for instance from an internal pressure drop) by a weight increase of the chain portion supported by the pipe, which, as it reascends towards the surface as a result of said lightening, lifts up a greater chain length or, to the contrary, of balancing a weight increase of the pipe (resulting for instance from a pressure increase therein), by a decrease of the chain length supported by the pipe. Accordingly, to a progressive change of the internal pressure in the pipe will correspond a progressive variation of its depth, so that at each moment, the pressure strains to which the pipe is subjected will remain unchanged.

This variation in depth may also be carried out in a discontinuous manner by stages, for instance by use of a chain of moorings distant from each other by intervals corresponding to the distance between the designed intermediate levels for the lowering or the withdrawal of the pipe. Such a system offers the advantage of being less expensive, particularly in the case where the sea bottom is at a great depth.

However, these stabilization systems by chains, or moorings chained to each other by means of cables, suffer from various disadvantages such as those resulting from the risks of hooking on the bottom, of tangling up cables or chains, and the like.

In order to avoid these disadvantages, there is provided another stabilization system according to this invention, which is characterized by the variation of the degree of filling of reservoirs associated to the pipe, in relation to the depth of the latter.

This stabilization by varying the extent of the filling of the reservoirs, intended to balance any casual variation of the pipe buoyancy, occurring for instance as a result of a pressure drop into the pipe, may be carried out easily by use of a flexible pipe comprising electric conductors in the thickness of its wall (by way of example such a type of pipe provided with electric conductors is described in the French Patent 1,249,236), said conductors being used in particular for providing passage to a current for controlling electromagnetic valves by means of which the communication between the reservoirs and the pipe is regulated.

It is accordingly possible, from one of the terminals of the pipe, by electrically controlling said valves, to vary at will the amount of gas (or of a liquid of lower density than that of water (derived from the pipe and contained in said reservoirs, which provide means for adjusting to the desired value the buoyancy of the pipe or of portions thereof.

Even if reservoirs are provided over the whole length of the pipe, they are separate from each other so that the amount of gas under pressure admitted into each reservoir may be adjusted independently from that admitted in the other reservoirs.

For this purpose there may be used for instance closed reservoirs with expanding sides made for example of neoprene, or rigid reservoirs communicating with external water, and from where the water may be expelled in the desired proportion by the fluid under pressure derived from the pipe.

These reservoirs, spaced over the whole length of the pipe, may be, for instance, provided with a moveable wall separating the fluid contained in the pipe from the external water. The displacement of this moveable wall, under the action of the pressure differences applied thereon, will be regulated by means of a convenient device so that the weight of the water volume introduced into or expelled from the reservoir by this displacement correspond exactly to the decrease or increase in weight of the pipe as a result of the change in its internal pressure.

This system has the advantage to permit the regulation of the pipe depth so as to balance, at least to a large extent, the internal pressure in the pipe by the external pressure of the water without requiring the fastening of the pipe either to buoys at the surface or to anchoring devices at the bottom.

The electrical energy necessary for actuating these remote controls is low and largely compatible with a transmission by means of conductors located into the wall of the pipe. In view to reduce the losses of energy through the conductors, the current may be transmitted under a high voltage and converted to a lower voltage by means of transformers located at the various points of use of the current. The maintenance and, if necessary, the replacement of such transformers is not a serious problem since the pipe may be raised back to the surface by remote control.

The controlling and measuring instruments may be placed at regular intervals along the pipe and their information also transmitted through electric conductors incorporated to the material of which the pipe is made, to a control station located for instance at one of the terminals.

In the case where this information reveals any defectiveness in the operation of a certain portion of the pipe, it is possible, by remote control of the valves through which are fed the reservoirs associated to this pipe portion, to raise back the latter to the surface, where the necessary repairs may be carried out easily.

The depth remote control may also be carried out for avoiding too strong undercurrents which would subject the pipe to extreme traction strains. The information on these current strengths being transmitted to the control station it is possible, at the locations where the current strength is high at the depth level of the pipe, to change this depth so that the pipe avoids these currents.

The remote control system may also be used, if desired, for giving to the pipe an upward inclination from its starting terminal to its delivery terminal, so determined as to provide for a balancing of the internal pressure variations, due to the pressure loss through the pipe, by corresponding variations of the external pressure of water on the pipe.

In such a case also, the depth adjustment may be carried out automatically by means of a servo-mechanism actuated by an instrument measuring the pressure difference (between the internal and the external pressures) to which the pipe is subjected, said servo-mechanism being for instance adjusted so as to equalize the internal and external pressure, or maintain a substantially constant difference therebetween.

Finally the depth of the various portions of the pipe may be measured by means of suitable devices the measures of which, transmitted to the control station in the form of an electric value give at each moment the exact positioning in depth of the pipe.

Moreover the exact position of the pipe, as projected for instance on a substantially horizontal plane, may be determined for example by feeding one of the inner conductors of the pipe with an electric current of predetermined frequency constituting a reference signal, and detecting said frequency at the surface.

Such a pipe is not subjected to any external factor except its starting and delivery terminals and accordingly it may be removed without any difficulty. This is of particular interest in the case of a pipe for conveyance of natural gas or crude oil for instance since the pipe may be reused when the exploited resources are exhausted.

Whatever may be the stabilization system used, the latter may be applied to flexible pipes having a metallic reinforcement, the apparent density of which is substantially higher than that of water, and associated to lightening means which may consist of floating bodies placed at more or less spaced intervals over the whole length of the pipe. Said floating bodies may contain a gas, optionally under pressure but this type of floating bodies has the drawback of requiring a high resistance of the same to crushing and to bursting (in view of the variations of the hydrostatic pressure with the change in depth of the pipe).

To the contrary, floating bodies containing a liquid of low density such as a light gasoline or liquid propane or butane (under moderate pressure) do not suffer from this drawback in view of the high incompressibility of the liquids and accordingly need not have a high resistance to pressure.

Instead of floating bodies spaced along the pipe the latter may be housed in a continuous casing made of a material having a lower density than that of water such as for instance cork, wood, spongy plastic materials such as polyvinylchloride, polyethylene, polypropylene, natural or synthetic rubber sponge, said list being not limitative.

Such a casing is not obligatorily provided on the whole length of the pipe and only a certain number of casing elements may be used provided that the lifting power due to the casing elements associated to a given pipe portion be slightly higher than the weight in water of said pipe portion. In the case where the casing elements are identical they may be placed at regular intervals and the lifting power of each casing element must be sufficient to balance the weight of the pipe portion in that casing together with an adjacent portion without casing comprised between two adjacent casing elements.

The use of floating bodies seems necessary in association with pipes made of a plastic material or of rubber and provided with a metallic reinforcement in view of increasing their resistance to pressure strains.

Pipes of this type made for instance of polyvinylchloride may sustain an internal pressure of 200 kg./cm.$^2$, a crushing pressure of 50 to 60 kg./cm.$^2$, a breaking load of 400 metric tons and a traction force of 100 metric tons. The latter is compatible with a spacing of the floating bodies every 10 km., which corresponds, in the case of a gas-filled pipe having a weight in water of the order of 2 kg. per meter, to a deflection of the order of 500 meters and to a traction force on each floating body of about 60 metric tons, the vertical component of which is of the order of 20 metric tons.

Of course, in the case of use of a flexible pipe having a high resistance to bursting and to crushing it is unnecessary to make use of the above-described security system. The pipe may even be suspended to surface buoys spaced along its whole length, the anchoring cables of the pipe having their length so adjusted as to impart to the latter the desired inclination in an upward direction from the starting to the delivery terminal, so as to maintain a substantially constant difference between the internal pressure and the hydrostatic pressure.

In such a case of a pipe or pipe portions the mechanical resistance of which is sufficient to sustain a drop of the internal pressure, and which have a positive buoyancy, said pipe or pipe portions may be maintained at the desired depth by anchorage with cables to the bottom either in the rock in the case of a rocky bottom or to heavy blocks having a sufficient weight to balance the lifting force of the pipe and the additional strains which may result from the action of undercurrents (see FIGURE 2). These blocks may consist of concrete casing containing heavy materials such as stones, stone packings, loam, dumped in bulk into the casing which is thereafter closed by a concrete slab.

These blocks are immersed at more or less spaced intervals according to the currents strength and the cables secured thereto are fastened to the pipe through tightening bands (K on FIGURE 2). By adjustment of the useful length of the cable the depth of the corresponding pipe portion may be determined at will.

In the case of strong currents such an anchorage placed substantially vertically beneath the pipe may be advantageously replaced by two anchorages inclined with respect to the vertical as shown in FIGURE 2. Such an anchoring system is of particular interest in view of avoiding any substantial drift of the tube when the latter is subjected successively to currents of the same general direction but of opposite orientations.

In such a case there will be used two blocks $M_1$, $M_2$ for anchoring the same pipe portion, preferably positioned along the direction of the currents.

The pipe may be laid very simply due to the simultaneous positioning of the stabilization device, for instance chains or chained moorings.

The lightening and/or stabilization means are such that the pipe is floating in spite of the chain weight when the internal gas pressure is equal to the atmospheric pressure.

In proportion to the gas pressure increase into the pipe, the latter becomes heavier and sinks progressively. However, the pipe must not sink to such a depth at which the hydrostatic pressure exceeds the internal gas pressure by a pressure difference higher than the pipe resistance to crushing.

This is made impossible according to this invention since, as the pipe progressively sinks due to the increasing gas pressure therein, new chain portions are laid on the bottom, which results in a progressive lightening which tend to balance the weight increase due to the gas pressure increase.

Accordingly it is possible to adjust the depth of the pipe to the level of the gas pressure therein so as to balance the internal pressure by the hydrostatic pressure to such an extent that at any moment the pipe will not be subjected to a pressure difference exceeding its resistance to crushing or to bursting.

It must be observed, however, that at least one portion of the pipe must be so designed as to support a higher pressure difference than that to which is subjected the remaining portion of the pipe. This is the pipe portion between the starting terminal and the depth at which the desired equilibrium between the internal pressure and the hydrostatic pressure is attained, in the vicinity of said terminal.

As a matter of fact the pressure difference to which the pipe is subjected at the output of the compression unit at the starting terminal is equal to the starting internal pressure.

It is therefore convenient to make use for this pipe portion of such a pipe structure that results in a higher resistance of that pipe portion to the pressure strains than the resistance required for the remaining part of the pipe.

Finally it must be noted that an increase of the flow rate through the pipe is attainable by use of a pipe having a slightly increasing diameter from the starting terminal to the delivery terminal, whereby the pressure loss is reduced.

In the case where such a pipe is to be used, the slope of the pipe which corresponds to a balancing of the internal pressure variations by the hydrostatic pressure variations is gentler and the self buoyancy of the pipe is increased.

It will be understood that, while there have been described certain specific embodiments of this invention it is not intended thereby to have this invention limited to or circumscribed by the specific materials or conditions herein specified, in view of the fact that the invention may be modified according to individual preference or conditions without necessarily departing from the spirit of this disclosure and the scope of the appended claim.

What is claimed is:

A pipe line for conveying fluid through a body of water, comprising a flexible pipe of extensive length having an inlet terminal, an outlet terminal, and an intermediate portion therebetween, said intermediate portion being immersed in a body of water, said pipe conveying fluid under pressure toward said outlet terminal, and said fluid having a density less than the said body of water, said pipe with said fluid having a positive buoyancy and said portion having an upward inclination toward said outlet terminal, stabilization means positioning said pipe at said inclination such that the difference of the pressures of the flowing fluid at an upper and a lower level spaced along said inclination being substantially equal in the same sense to the difference in the hydrostatic pressures of said body of water at said respective levels and wherein the pressure of the flowing fluid at said lower level being at least as great as the pressure of said body of water at said lower level.

References Cited by the Examiner

UNITED STATES PATENTS

| | | | |
|---|---|---|---|
| 2,770,950 | 11/56 | Collins | 61—72.3 |
| 2,783,027 | 2/57 | Gilbert | 61—72.3 X |
| 2,871,665 | 2/59 | Brandt | 61—72.3 |
| 2,900,795 | 8/59 | Brandt | 61—72.3 |
| 3,021,864 | 2/62 | Young | 61—72.3 X |
| 3,136,133 | 6/64 | Perret | 61—72.3 |

FOREIGN PATENTS

| | | |
|---|---|---|
| 2,705 | 1865 | Great Britain. |
| 2,141 | 8/66 | Great Britain. |
| 1,520 | 7/58 | Great Britain. |
| 863,000 | 3/61 | Great Britain. |

CHARLES E. O'CONNELL, *Primary Examiner.*

EARL J. WITMER, *Examiner.*